April 16, 1929.  J. C. CUNNINGHAM ET AL  1,709,119
AUTOMATIC PRESSURE CONTROLLED VALVE
Filed June 7, 1927
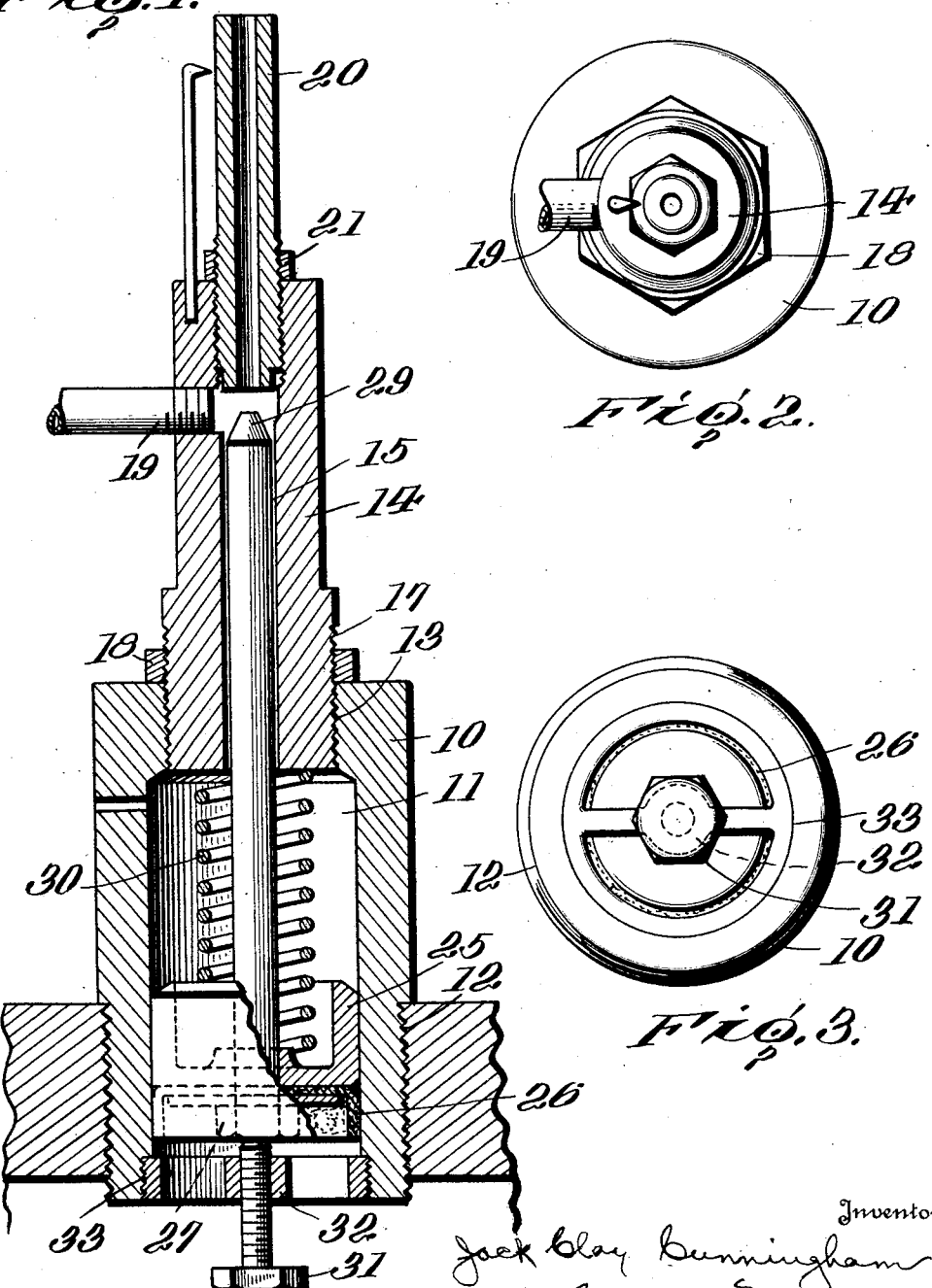

Patented Apr. 16, 1929.

1,709,119

UNITED STATES PATENT OFFICE.

JACK CLAY CUNNINGHAM AND WILLIAM STEWART NELSON, OF PASADENA, CALIFORNIA.

AUTOMATIC PRESSURE-CONTROLLED VALVE.

Application filed June 7, 1927. Serial No. 197,107.

This invention is a pressure control device for regulating the flow of gases and liquids.

One of the objects of the invention is to provide a valve which is normally biased to open position, and means exposed to pressure variations within an enclosed space, for seating said valve when said pressure exceeds a predetermined critical degree. A further object is to provide simple means for adjusting the valve operation to different degrees of controlling pressure, so that the valve may be set for any desired predetermined critical pressure.

The invention will be hereinafter fully set forth and particularly pointed out in the claims.

In the accompanying drawing:—

Figure 1 is a longitudinal sectional view illustrating a valve constructed in accordance with the invention. Figure 2 is a top plan view thereof. Figure 3 is a bottom plan view thereof.

Referring to the drawing, 10 designates a casing provided with an internal pressure chamber 11. The lower end of said casing is exteriorly threaded as indicated at 12, so as to removably engage an opening in the casing of a boiler, or other enclosed space which is normally subject to fluctuations in internal pressure. Said chamber is open at both ends, the upper end 13 being of smaller diameter than that at the lower end, and internally threaded, as shown.

Removably mounted in the opening 13 is a valve-stem-guide member 14, provided with a longitudinal bore 15, the upper end of which is internally threaded as indicated at 16. The lower end of said bore is threaded as indicated at 17 to engage the threads of the openings 13. A lock nut 18 serves to normally prevent disengagement of the guide member 14 from the casing 10. The bore 15 is provided with an offset branch 19, as shown.

Removably mounted in the threaded opening 16 of the valve-stem guide is an inlet tube 20, which may be adjusted longitudinally with respect to the offset branch 19 of the bore 15, and locked in the adjusted position by the nut 21. If desired a gage 22 may be employed as a guide in making such adjustments.

Reciprocably mounted within the chamber 11 is a piston 25, provided with the usual leather cup 26. Connected to said piston by means of a nut 27 is a valve stem 28, having a tapered valve end 29, which is adapted to cooperate with the lower end of the inlet tube 20, which serves as a valve seat for the said valve 29. A spring 30 is interposed between the lower end of the valve-stem guide 14 and the piston 25, and acts to normally hold the valve 29 away from its seat.

Movement of the valve stem and piston in one direction, under the influence of the spring 30 is limited by means of an abutment screw 31, which is adjustably mounted in a threaded hub 32, of a collar 33, which is mounted in the larger open end of the chamber 11.

In practice, the casing 10 is mounted upon the shell of a boiler or other enclosed space which is subject to variations of internal pressure, the larger open end of the casing communicating with said space. The device may be used for various purposes, but by way of illustration it may be assumed that the pipe 20 is the inlet pipe of a gas supply, furnishing fuel to a burner which serves to heat a boiler, and that the outlet branch 19 serves to connect said pipe 20 with the burner. Or if desired, the branch 19 may be the inlet and the pipe 20 the outlet. As the steam pressure is built up within the boiler the effect of the increase of pressure is to force the piston 25 longitudinally, in opposition to the tension of the spring 30, and if the rise in pressure is great enough, the valve 29 will seat against the lower end of the tube 20, at which time the flow of gas is stopped. It will be noted, however, that up to the time of sealing of the valve, the volume of gas flowing to the burner is increased or diminished in accordance with the distance that the valve 29 is spaced from the lower end of the bore of the tube 20. As the pressure within the pressure space diminishes the reaction of the spring 30 returns the piston to its normal position, the return movement being limited by the abutment screw 31. In order to provide a safety factor, the chamber 11 is provided with a vent 35, for any excess pressure which may build up between the piston and the valve stem guide.

It is to be understood that although the invention has been described as being utilized in controlling the flow of gas to a burner, it is not limited to any such use, but may be employed for the control of flow of gases or fluids in any instance where it is desired to insure that the volume of flow is commensurate with pressure conditions.

The advantages of the invention will be readily apparent to those skilled in the art to which it belongs. It will be particularly noted that the valve is simple in construction, and being made up of few parts will not readily get out of order or become deranged. It is obvious that it is very sensitive in its operation, and thereby economical, because the operating pressure is always opposed to the tension of the returning spring, so that the position of the valve 29 with respect to its seat is always that which will insure a proper volume of flow through the inlet and outlet.

Having thus explained the nature of the invention and described an operative manner of constructing and using the same, although without attempting to set forth all of the forms in which it may be made, or all of the forms of its use, what is claimed is:—

1. A pressure control valve comprising a a body having an open ended pressure chamber, a valve-stem guide adjustably mounted in one end of said chamber and having an inlet and an outlet opening, an inlet tube adjustably mounted in one of the openings of said guide member and having its inner end provided with a valve seat, means for normally retaining said tube in adjusted position, a valve stem extending through said guide and provided with a valve cooperating with said seat, a spring normally acting upon said stem to move said valve away from said seat, a piston also connected with said valve stem and mounted to reciprocate within said chamber, so that pressure acting upon the piston will tend to move said valve against the tension of said spring, an abutment carrier removably mounted in an open end of said chamber, and an abutment screw adjustably mounted in said carrier and positioned to limit movement of the piston under the tension of said spring.

2. A pressure control valve comprising a pressure chamber open at both ends, a valve stem guide provided with a longitudinal bore, one end of said guide being removably connected with one open end of said chamber, the bore contiguous to the other end being provided with an offset branch, an inlet tube adjustably engaging the bore of said valve stem guide adjacent to said offset branch, the inner end of said inlet tube being provided with a valve seat, a piston mounted to reciprocate within said pressure chamber, a valve stem connected with said piston and extended through said chamber and also through said valve stem guide, said valve stem having a valve on one end cooperating with said valve seat, and a spring interposed between said piston and the adjacent end of said valve stem guide and normally acting to move the valve away from its seat.

3. A pressure control valve comprising a pressure chamber open at both ends, a valve stem guide provided with a longitudinal bore, one end of said guide being removably connected with one of the open ends of said chamber, the bore at the other end of said guide being internally threaded and provided with an offset branch contiguous to said threaded portion, an inlet tube threaded at its inner end to adjustably engage the threaded end of the bore of said guide, the inner end of said tube being provided with a valve seat, a nut working on the thread of said tube and cooperating with the adjacent end of the valve stem guide to normally lock said inlet tube against rotation, a piston mounted to reciprocate within said pressure chamber, a valve stem connected with said piston and extended through said chamber and also through said valve stem guide, said stem having a valve on one end cooperating with said valve seat, and a spring interposed between said piston and the adjacent end of said valve stem guide and normally acting to move the valve away from its seat.

4. A pressure control valve comprising a chamber open at both ends, an abutment member adjustably mounted in one of said open ends, a valve stem guide provided with a longitudinal bore, one end of said guide being removably connected with the other open end of said chamber, an inlet tube adjustably connected with the outer end of the bore of said guide and provided with a valve seat at its inner end, the bore of said guide being provided with an offset branch adjacent to said valve, a piston mounted to reciprocate within said pressure chamber, a valve stem connected with said piston and extended through said chamber and also through said valve stem guide, said valve stem having a valve on one end cooperating with said valve seat, and a spring interposed between said piston and the adjacent end of said valve stem guide and normally acting to move the valve away from its seat, the movement of the valve under the tension of said spring being limited by said abutment member.

In testimony whereof we have hereunto set our hands.

JACK CLAY CUNNINGHAM.
WILLIAM STEWART NELSON.